Figure 1:
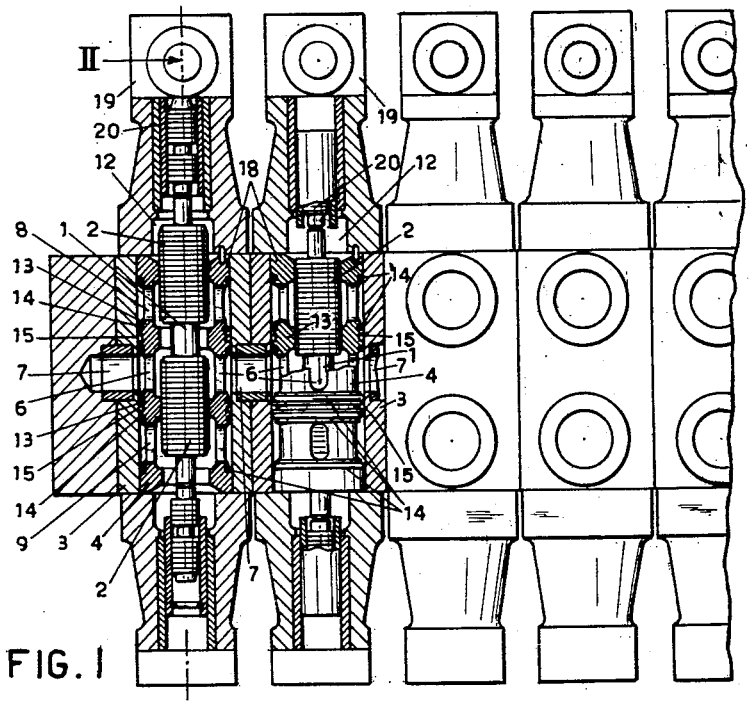

Feb. 20, 1962 W. J. TULP 3,022,041
LININGS FOR GUIDING SLIDE VALVES, DISC VALVES
OR LIKE MEMBERS IN A VALVE CASING
Filed Oct. 5, 1959 2 Sheets-Sheet 1

INVENTOR
WIJBRAND J. TULP

BY
ATTORNEY

INVENTOR
WIJBRAND J. TULP

United States Patent Office 3,022,041
Patented Feb. 20, 1962

3,022,041
LININGS FOR GUIDING SLIDE VALVES, DISC VALVES OR LIKE MEMBERS IN A VALVE CASING
Wijbrand J. Tulp, Utrecht, Netherlands, assignor to N.V. Machinefabriek Frans Smulders, Utrecht, Netherlands, a company of the Netherlands
Filed Oct. 5, 1959, Ser. No. 844,460
Claims priority, application Netherlands Oct. 7, 1958
3 Claims. (Cl. 251—324)

The invention relates to a lining for guiding a slide valve, disc valve or like member in a valve casing for use in a device for controlling the pressure fluid in a pressure system. Such a member is for instance an unloaded cylindrical slide valve mounted for axial movement in a boring of the casing and adapted to make communications between ports in said boring.

Slide valve of this type must be easily movable with little play or clearance in the boring of the bridges between the ports since otherwise rather great losses will occur due to leakage. This leakage current affects the hydrostatic equilibrium in the leakage gap around the slide valve unfavourably. As a result thereof transverse forces seriously hampering the movement of the valve in the boring will be exerted on the valve. If on the other hand the play is made very small the cylindrical shape of the valve and the boring must be made with great precision. However, it is very difficult to maintain this exact shape of the boring during the assembling of the casing, since the connecting bolts may during the assembly cause a deformation of the casing. The deformation of the casing may also be produced by hydrostatic pressure in one or more chambers or spaces communicating with the ports since the stresses produced by this pressure, as a result of the fact that the casing is not completely symmetrical in shape, will deform said casing asymmetrically. In many cases these deformations cause a play of the valve in the casing which is greater than desired because of the leakage losses. Due to the pressure within the casing the play or clearance is increased and the expansion of the casing will, due to the shape of the casing, deform the annular shape of the clearance gap, so that besides an increase of the leakage losses there will be interference with the hydrostatic equilibrium in the gap.

The object of this invention is to avoid the above mentioned disadvantages.

The invention provides a loose lining in the casing with a rather great play between the lining and the casing. In order to make this play or clearance possible, one or more elastic packing rings or bands are provided around the lining in or on the bridges between the ports. The space between two packing rings of a bridge may be connected to discharge passage in the casing. This prevents the creation of pressure in the gap between the lining and the casing due to leakage, so that the lining may be completely hydraulically balanced.

Figure 2:
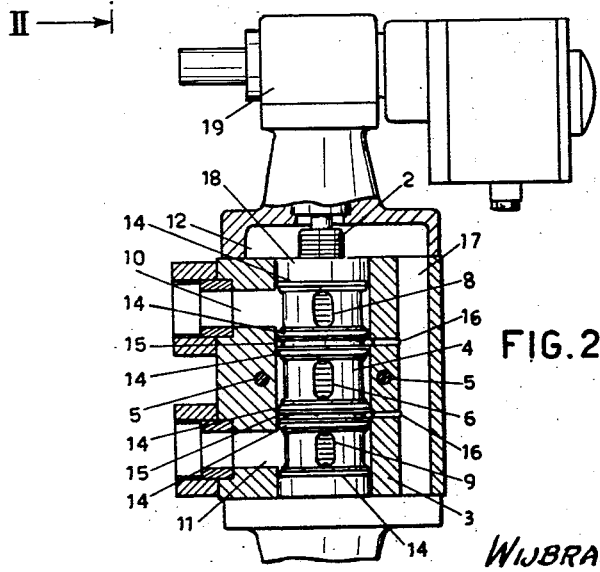
Figure 3:
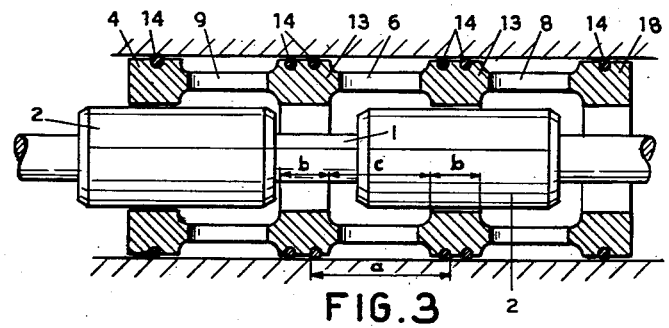
Figure 3A:
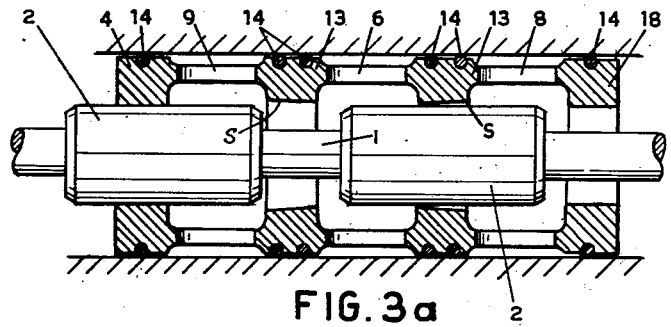
Figure 3B:
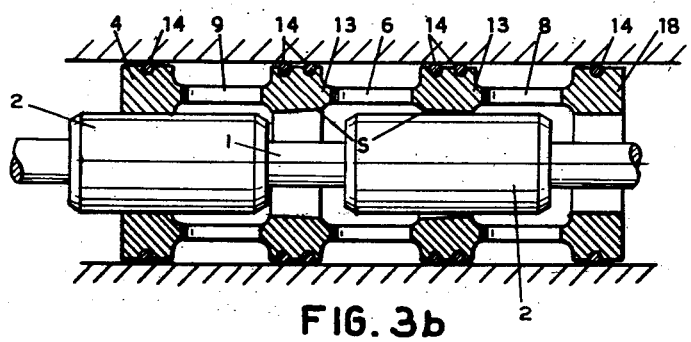

For the elucidation of the invention reference is made to the accompanying drawing, in which:

FIG. 1 illustrates a plan view of the casings of a number of slide valves which are combined to one block, in which two of said casings are shown in longitudinal section, FIG. 2 is a sectional view of the casing of one of the slide valves taken on the line II—II in FIG. 1, FIG. 3 shows on a larger scale one of the linings illustrated in FIG. 1, and FIGS. 3a and 3b show slightly different embodiments of said lining.

The valves 1 illustrated in the drawing are double-acting valves, so that each valve has two valve bodies 2. In the boring of each valve casing 3 a loose lining 4 is provided with play or clearance and the casings are assembled to a block by means of bolts 5. The lining 4 has in its middle, ports 6 connected with chambers 7 of the casing. Said chambers are connected to a pressure liquid supply conduit. The lining is also provided with two series of ports 8 and 9, of which the ports 8 are connected to a passage 10 and the ports 9 to a passage 11. Said passages communicate with the cylinders or motors to be fed. The chambers 12 at either end of the valve 1 communicate with the discharge conduit for the pressure liquid.

In order to control the forces exerted on the lining 4 from the inside and from the outside, the width of the clearance gap between the valve and the lining must be controlled and therefore two packing rings 14 are seated in grooves in the bridge 13 between the ports 6 and 8 on one side and in the bridge 13 between the ports 6 and 9 on the other side. Moreover, an annular channel 15 is provided in each bridge between the packing rings. These channels are each connected by a passage 16 with a passage 17 communicating with the discharge chambers 12. Provided in the bridges 18 between the port 8 or 9, respectively, and the discharge chamber 12 there is mounted only one packing ring 14. Since the lining is completely symmetrical and the axial hydraulic forces will not give rise to its deformation.

As the discharge ports of the lining communicating with the discharge chambers 12 are provided in the end faces of the lining and not in the periphery thereof, which up to now was usual, the lining may be made very short, which has the advantage that it may be manufactured with much greater precision. The clearance or play in the casing outside the lining is so large that deformation of the casing due to hydraulic forces or due to the assembling of several casings to a block or owing to other circumstances do not cause unfavourable deformation of the lining.

Each valve may be controlled by means of a pilot valve mounted in a casing 19 for controlling the supply of pressure liquid to a plunger 20.

What is said hereabove is based on the wish that the gap between the valve body and the lining is kept as uniform as possible under all conditions. In order to prevent hydraulic jamming of the valve body or like member it may be desirable that the width of the said gap between a zone in which high pressure is present and a zone in which the pressure is lower is not constant in axial direction.

FIG. 3 shows that the axial connecting parts between the bridges of the lining are provided intermediate the inner and the outer diameter of the bridges.

As is shown in FIG. 3a these connecting parts may also be provided at greater distances from the axis of the valve body so that the width of the gap $s$ will increase towards the port 8 or 9.

If however, as is illustrated in FIG. 3b, the connecting parts between the bridges 13 are arranged at smaller distances from said axis, a gap $s$ is obtained, of which the width decreases towards the port 8 or 9.

In order to balance the lining hydraulically it is preferred to mount the packing rings 14 flanking the port 6 in such a manner, that the axial distance $a$ between the edges of the packing ring grooves remote from the port 6, is made greater than half the axial width $c$ of said port on the inner side of the lining. However, this axial distance $a$ must be smaller than the sum of the axial width $c$ of said port and the breadth $b$ of the bridge 13 on the inner side of the lining.

What I claim is:
1. A slide valve for use in a device for controlling the pressure fluid in a pressure system, comprising a casing, a lining in said casing, and a valve element slidable in said lining, the inner periphery of said casing being greater than the outer periphery of said lining to provide clearance therebetween, said lining having ports in its circumferential wall separated by bridge portions, each of the bridge portions adjacent at least one of said ports having in its peripheral wall two annular grooves and an annular channel between said grooves, and two elastic sealing rings respectively seated in the two grooves of said bridge portions, said casing having passage means for connection of a low pressure outlet with said channels between the grooves, the sealing rings and their grooves flanking at least one of the ports of the lining being disposed so that the axial distance between the remote edges of the grooves adjacent said port is greater than the axial width of the port on the inside of the lining, but smaller than the sum of this width and the width of the bridge at the inside of the lining.

2. A slide valve as claimed in claim 1, characterized in that the inner surfaces of the bridge portions adjacent the valve are inclined to the valve axis.

3. A slide valve as claimed in claim 1, characterized in that the intermediate liner portions between the bridge portions are located at such a radial distance from the axis of the lining that the areas of the annular side faces of the bridge portions subjected to the pressure fluid on the outer side of the intermediate liner portions differ from the areas of the annular side faces of the bridge portions subjected to the pressure fluid on the inner side of said intermediate liner portions.

References Cited in the file of this patent

UNITED STATES PATENTS

| | | |
|---|---|---|
| 1,820,653 | Ernst | Aug. 25, 1931 |
| 2,621,050 | Campbell | Dec. 9, 1952 |
| 2,767,689 | Moog | Oct. 23, 1956 |